United States Patent [19]

Delao

[11] 3,744,222
[45] July 10, 1973

[54] CORRUGATED BOARD PAINT FILTER

[76] Inventor: Alexander Delao, 3732 Bell Avenue, Bell, Calif. 90201

[22] Filed: Dec. 16, 1970

[21] Appl. No.: 98,535

[52] U.S. Cl................. 55/446, 55/482, 55/DIG. 31, 161/135
[51] Int. Cl............................................. B01d 45/08
[58] Field of Search..................... 55/445, 446, 485, 55/482, 497–499, DIG. 31; 161/135; 98/115 SB

[56] References Cited
UNITED STATES PATENTS

| | | | |
|---|---|---|---|
| 1,119,146 | 12/1914 | Ferres | 161/135 |
| 1,520,267 | 12/1924 | Waltz | 98/115 SB |
| 1,752,260 | 3/1930 | Calder et al. | 55/446 |
| 2,907,408 | 10/1959 | Engle et al. | 55/497 |
| 3,458,977 | 8/1969 | Young et al. | 55/497 |
| 2,408,659 | 10/1946 | Lamb | 55/485 |
| 2,765,869 | 10/1956 | Benjamin et al. | 55/446 |
| 3,272,484 | 9/1956 | Brand et al. | 261/112 |

FOREIGN PATENTS OR APPLICATIONS 565,265   11/1944   Great Britain........................ 55/497

*Primary Examiner*—Bernard Nozick
*Attorney*—Lavine, Cantor & Reich

[57] ABSTRACT

A filter for a paint spray booth comprising three walls of single face corrugated board having holes in each wall offset from holes in an adjacent wall; a rear wall has forwardly extending sides, a second wall within the sides has forwardly and rearwardly directed spacer flaps, and a third wall is supported at the forward edges of the sides.

7 Claims, 3 Drawing Figures

PATENTED JUL 10 1973 3,744,222

INVENTOR
ALEXANDER DELAO

BY Lavine, Cantor + Reich
ATTORNEYS

CORRUGATED BOARD PAINT FILTER

BACKGROUND OF THE INVENTION

The present invention relates to a paint filter or paint arrester for use in paint spray booths.

Products of various kinds are frequently painted through the use of paint spray apparatus, in which a spray or mist of paint droplets is directed against an object to be painted. A substantial amount of the projected paint spray is not deposited upon the object being painted, but instead passes by or around that object. In the conventional paint spray booths where spray painting is performed, a current of air is caused to flow through the paint spray booth, and it is desirable that the air being exhausted from the paint spray booth be delivered to atmosphere with a minimal amount of paint remaining in it. To this end, paint filters or paint arresters have been used. Typically, these were composed of a wire grid structure which supported a cellular material in the form of a pad. These paint filters have been, however, subject to a number of deficiencies.

Among the deficiencies of the prior known exhaust paint filters or paint arresters as above described were the expense involved. In addition, these known paint arresters were inflamable, and therefore presented a fire hazard. These filters were also subject to clogging, which thereby reduced the velocity of the air flowing through them and through the paint spray booth, so that the entire painting operation suffered a decrease in efficiency. Further, these prior known paint filters required brackets or holders in order to fasten them in position in a supporting structure.

SUMMARY OF THE INVENTION

The present invention paint filter is made essentially of single face corrugated board. So-called "single face" corrugated board is corrugated board formed of a single planar liner having adhesively secured thereto a corrugated medium, both liner and medium being made of paper sheets. The corrugated board paint filter of the present invention has three parallel, spaced walls each of generally rectangular plan form, and each of substantially the same size. The corrugated medium of the rear wall is in facing relationship to the liner of the intermediate wall, and the corrugated medium of the intermediate wall is in facing relationship to the liner of the front wall; each of the walls is provided with a plurality of holes, with the holes in one wall being offset from the holes in an adjacent wall. The rear wall is provided with four integral sides which extend forwardly, to form a generally box-like structure. An intermediate wall is provided with four integral spacer flaps, one pair extending from opposite sides thereof towards the rear wall and the other pair extending from opposite sides towards a front wall. The front wall and the intermediate wall are supported within and by the four forwardly directed sides of the rear wall.

The filter is positioned so that the air strikes against the corrugated medium of each of the walls, passing through the holes therein. This results in a large area being subjected to the flow of the paint-laden air, so that paint is deposited upon the three corrugated mediums, the air being caused to turn, due to the offsetting of the holes, and thereby causing paint particles to be thrown by centrifugal force against the corrugated medium of the second and rear walls.

Among the objects of the present invention are to provide a paint arrester or filter which will be inexpensive to construct, of inexpensive and readily available materials. Another object of the present invention is to provide a paint arrester which will have a reduced tendency for catching fire, and therefore will provide a reduced fire hazard. Yet another object of the present invention is to provide a paint filter which will have a greatly reduced tendency to clog, and which will therefore permit flow of air at normal velocity over an extended period of use.

Yet another object of the present invention is to provide a paint filter requiring no unusual brackets or holders to position it in the paint spray booth structure.

DESCRIPTION OF THE PREFERRED EMBODIMENT

Figure 1:
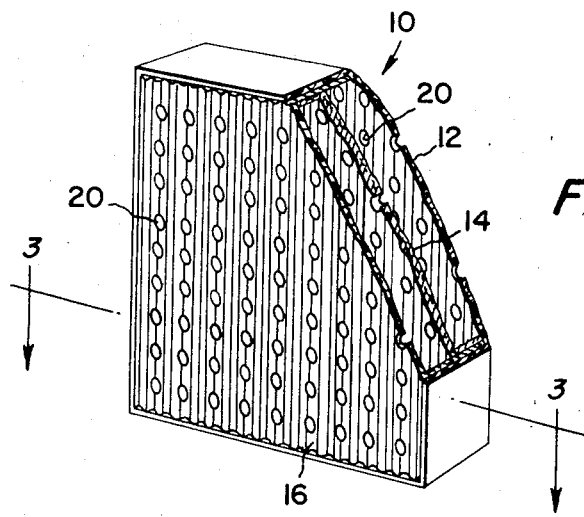
FIG. 1 is a perspective view, with parts broken away, showing a corrugated board paint filter in accordance with the present invention.
Figure 3:
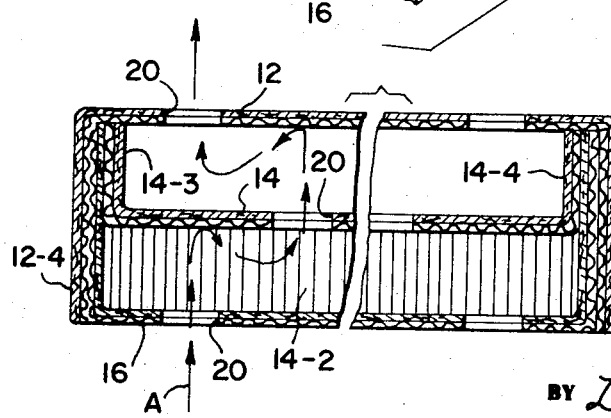
FIG. 3 is a cross-sectional view taken on the line 3 — 3 of FIG. 1.

Referring now to the drawings, wherein like or corresponding reference numerals are used to designate like or corresponding parts throughout the several views, there is shown in FIG. 1 a filter generally designated 10, and comprising a rear wall 12, an intermediate wall 14, and a front wall 16. The aforementioned walls 12, 14 and 16 each has a square or generally rectangular plan form, and each is of substantially the same size as the others. A plurality of spaced holes 20 are provided in each of the three walls, to permit air laden with paint particles to flow therethrough. The holes 20 in the second or intermediate wall 14 are offset from the holes 20 in the rear wall 12 and the front wall 16, this being more particularly shown in FIG. 3.

Figure 2:
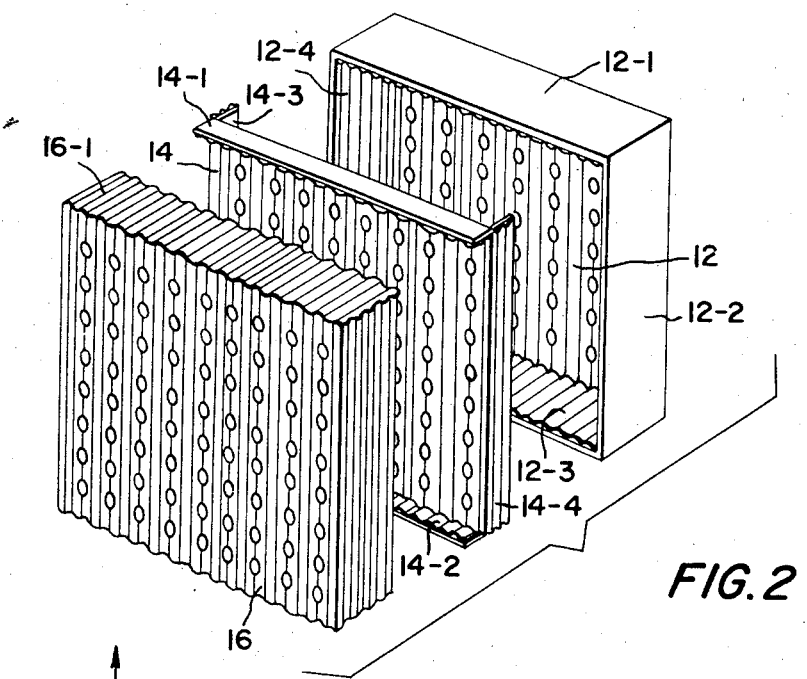
FIG. 2 is an exploded view, in perspective, of the corrugated board paint filter of FIG. 1.

Referring now to FIG. 2, the rear wall 12 has four sides designated 12-1, 12-2, 12-3 and 12-4, these sides preferably being integral with the rear wall 12, and extending forwardly at right angles to rear wall 12, so as to form a generally box-like structure.

The second or intermediate wall 14 is provided with an upper flap 14-1 and a lower flap 14-2, these two flaps extending from opposite side margins of the wall 14 forwardly, or away from the rear wall 12. In addition, spacer flaps 14-3 and 14-4 extend from the other opposite side margins of the wall 14, towards the wall 12.

The first or front wall 16 is planar, and may be provided with flaps extending rearwardly, either an upper flap 16-1 and a lower flap, or additionally side flaps may be provided.

Each of the walls 12, 14 and 16 is made of a single sheet of single face corrugated board (see FIG. 3) comprising a sheet of corrugated medium adhesively secured to a liner sheet, both the corrugated medium and the liner being of paper. As may be seen in FIG. 2, the corrugated medium of rear wall 12 is in facing relationship to the liner of wall 14, and the corrugated medium of wall 14 is in facing relationship to the liner of wall 16. As above mentioned, there may also be seen in FIG. 3 the holes 20 in each of the walls, with the holes in one wall being offset from the holes in the wall adjacent to it. The sides 12-2 and 12-4 of rear wall 12 may be seen extending forwardly from the rear wall 12, generally perpendicular thereto. The spacer flaps 14-3 and 14-4 are seen extending rearwardly from the wall 14, within the sides 12-2 and 12-4, and substantially engaging the front of rear wall 12, to thereby provide the appropriate spacing between walls 12 and 14. The spacer flap 14-2 may be seen extending forwardly from wall 14, and abutting the rear of front wall 16, thereby providing, together with spacer flap 14-1 which is not shown in FIG. 3, spacing between walls 14 and 16. Front wall 16 is just within the forward edges of the sides of rear wall 12, so that there is thereby provided a generally box-like structure having side walls as well as front and rear walls and an intermediate wall which define a pair of unobstructed, peripherally bounded chambers.

As will be understood, the present invention paint filter may be made from readily obtainable and economical single face corrugated board, and manufactured by conventional cutting and scoring operations to form the three parts best shown in FIG. 2. The parts are then assembled and are held in assembled relationship by any suitable means, such as adhesive tape, staples, adhesive, etc.

In use, air flowing towards the corrugated medium of front wall 16, generally designated by the arrow A, will pass through the holes 20 in wall 16 and will then be deflected into a twisting and turning configuration, so as to pass through the holes 20 in the second or intermediate wall 14. Thereafter, a further turning and twisting of the air is required in order for it to pass through the holes in rear wall 12. In addition, it will be understood that due to the large surface area of each of the corrugated mediums forming a part of each of the walls 12, 14 and 16, there will be substantial surface contacted by the paint-laden air, thereby causing paint mist particles to adhere to the corrugated mediums. Also, the turning and twisting of the air will cause, by centrifugal force, the throwing of the paint particles against corrugated mediums, so as to provide for further trapping of the paint within the paint filter 10.

Because the paint will accumulate on the surfaces of the corrugated mediums, it will not block the holes 20, and therefore even after a period of continued extensive use, there will be no clogging of the filter of the present invention, and therefore the present invention filter will last substantially longer than heretofore known filters. Even after the present filter 10 has accumulated a relatively large quantity of paint, there will be no change in the air velocity in the paint spray booth with which the present invention filter is used, because the holes 20 do not tend to become clogged and therefore the resistance of the present invention filter does not significantly change over a long period of use. Further, because of the construction of the present invention filter, the danger of fire is considerably less than in previous filters, and in addition, the present invention filter does not require brackets, holders or wire grids in order to hold it in position.

It will be obvious to those skilled in the art that various changes may be made without departing from the spirit of the invention, and therefore the invention is not limited to what is shown in the drawings and described in the specification but only as indicated in the appended claims.

I claim:

1. A filter made essentially from paper comprising:
a plurality of spaced apart walls each comprising a corrugated sheet and a paper liner sheet, holes extending through each said wall for the passage of gaseous medium through said walls, the holes in one wall being offset from the holes in the wall adjacent thereto to cause deflection of gaseous medium between an upstream wall and a down stream wall and the depositing of particulate material carried by said gaseous medium onto a said wall,
and frame means for holding said walls in said spaced apart relationship to each other and for defining a peripherally bounded chamber between said walls, said chamber being substantially unobstructed.

2. The filter of claim 1, wherein the corrugated sheet of one wall is in facing relationship to the liner sheet of an adjacent wall.

3. The filter of claim 1, one said wall being a rear wall of generally rectangular plan form, said frame means defined by said rear wall having four sides integral therewith and extending perpendicularly thereto, a second said wall being supported by said four sides.

4. The filter of claim 3, said second wall being of similar size and plan form to said rear wall, said second wall having a pair of integral spacer flaps extending from opposite side margins thereof toward and engaging said rear wall.

5. The filter of claim 4, said second wall having a second pair of integral spacer flaps extending from the other opposite side margins thereof oppositely to said first pair of spacer flaps, and a third wall parallel to said first two walls supported by said four sides of said rear wall, said third wall engaging said second pair of spacer flaps.

6. The filter of claim 5, wherein the corrugated paper sheet of the rear wall is in facing relationship to the liner sheet of the second wall.

7. The filter of claim 5, wherein the corrugated paper sheet of the second wall is in facing relationship to the liner sheet of the third wall.

* * * * *